United States Patent [19]
Helferich

[11] Patent Number: 5,544,549
[45] Date of Patent: Aug. 13, 1996

[54] PROCESS FOR THE PRODUCTION OF A STEEL PUNCHING SHEET

[76] Inventor: Fritz Helferich, FL-9495, Holdenstrasse 501, Triesen, Liechtenstein

[21] Appl. No.: 239,817

[22] Filed: May 9, 1994

Related U.S. Application Data

[62] Division of Ser. No. 203,957, Mar. 1, 1994, which is a continuation of Ser. No. 585,482, Sep. 20, 1990, abandoned.

[30] Foreign Application Priority Data

Sep. 22, 1989 [CH] Switzerland .......................... 3643/39

[51] Int. Cl.$^6$ .......................................... B21K 5/20
[52] U.S. Cl. .................. 76/107.8; 29/402.19; 72/376; 216/52; 216/100; 83/651
[58] Field of Search .............................. 76/107.1, 107.8; 83/651, 652, 684, 697; 72/375, 376; 29/402.19; 216/52, 75, 100, 102–107

[56] References Cited

U.S. PATENT DOCUMENTS

| | | | |
|---|---|---|---|
| 3,535,955 | 10/1970 | Otto et al. .......................... | 76/107.8 |
| 3,850,059 | 11/1974 | Kang .................................. | 83/346 X |
| 4,226,143 | 10/1980 | Whitecotton et al. ............... | 76/107.8 |
| 4,326,434 | 4/1982 | Mohr et al. ......................... | 76/107.8 |
| 4,729,274 | 3/1988 | Marbach ............................. | 76/107.8 X |
| 4,848,190 | 7/1989 | Doslik et al. ....................... | 76/107.8 X |
| 4,955,855 | 9/1990 | Saebeler et al. .................... | 76/107.8 X |
| 4,966,054 | 10/1990 | Beck .................................. | 76/107.8 X |

Primary Examiner—Eugenia Jones

[57] ABSTRACT

A process for producing a steel punching sheet that has the same ideal dimension over the entire length of the punching edge has the following steps: producing webs carrying punching edges on a steel starting sheet; processing the punching edges, wherein the distance between the punching edges and the back of the sheet is adjusted to a positive tolerance with respect to an ideal dimension; and grinding the back of the sheet to remove material in excess of the ideal dimension to within a tolerance of not more than 0.02 mm, more particularly a tolerance of not more than 0.005 mm. Advantageously, the process includes the following additional steps: adjusting the distance between the punching edges and the back of the sheet to a negative tolerance, with respect to an ideal dimension, and applying material to the back of the sheet to make-up for the negative tolerance up to a positive tolerance of not more than 0.02 mm, more particularly, a tolerance of not more than 0.005 mm; and adjusting the distance between the back of the punching sheet and the punching edge by guiding a non-cutting tool along the side walls; and pressing the non-cutting tool on both side walls directly in the region of the punching edge.

18 Claims, 4 Drawing Sheets

PROCESS FOR THE PRODUCTION OF A STEEL PUNCHING SHEET

This application is a division of application Ser. No. 08/203,957, filed Mar.1, 1994, pending which is a continuation of 07/585,482, filed Sep. 20,1990, now abandoned.

Process for Production of a Steel Punching Sheet

1. Field of the Invention

This invention relates to a process for producing a steel punching sheet that can be used for various purposes, but is employed in particular for punching labels from a paper or other film material.

2. Background of the Invention

Such a punching sheet has a front, a back and at least one web that projects from the front and carries a punching edge. To enable the labels to be punched out satisfactorily, the punching edges must be specially sharpened. This sharpening of the edges, which is carried out after production of the desired contours by means of relief etching or other conventional cutting methods of production, is generally effected manually by removal of material with grinding and scraping tools or by machine. The problem in the case of steel punching sheets produced in this manner is to achieve, for all punching edges, the same ideal dimension of the steel punching sheet, said dimension required for satisfactory punching. Because of the existing steel sheet tolerances, this requirement is not met merely by mechanical sharpening of the punching edges; because of its labor-intensive nature, there are natural limits to subsequent manual grinding.

SUMMARY OF INVENTION

The invention relates to a process for producing a steel punching sheet that has the same ideal dimension over the entire length of the punching edge.

A process according to the invention has the following steps:

producing webs carrying punching edges on a steel starting sheet;

processing the punching edges, wherein the normal distance between the punching edges and the back of the sheet is adjusted to a positive tolerance with respect to an ideal dimension; and grinding the back of the sheet to remove material in excess of the ideal dimension to within a tolerance of not more than 0.02 mm, more particularly a tolerance of not more than 0.005 mm.

Advantageously, the process includes the following additional steps:

Producing a punching edge that is not more than 0.01 mm wide, more specifically, not more than 0.005 mm wide, in particular, not more than 0.001 mm wide.

Adjusting the normal distance between the punching edges and the back of the sheet to a positive tolerance by applying material to the back of the sheet.

Adjusting the normal distance between the punching edges and the back of the sheet to a negative tolerance, with respect to an ideal dimension, and applying material to the back of the sheet to make-up for the negative tolerance up to a positive tolerance of not more than 0.02 mm, more particularly, a tolerance of not more than 0.005 mm.

Fixing the punching sheet to a retaining plate, orienting the punching edges toward the retaining plate, and introducing lamellar spacers between the front of the punching sheet and the retaining plate.

Fixing the punching sheet to the retaining plate by a regulatable retaining force.

Obtaining curved surfaces on the side walls by pressing on both side walls.

Pressing convex curved surfaces on the side walls.

Pressing concave curved surfaces on the side walls.

Guiding a non-cutting tool along the side walls, and pressing the non-cutting tool on both side walls directly in the region of the punching edge.

It is particularly expedient to produce the steel punching sheet with the aid of a tool having the following features:

a holder;

two hard metal pins fixed to one another in the holder, the pins having parallel longitudinal axes and lower ends with lateral surfaces, wherein at a first section along a first plane, parallel to a plane determined by the two longitudinal axes of the pins, the lateral surfaces of the pins contact the side walls and form an angle B1 with one another, which is at least equal to the angle, $\alpha$, between the side walls;

and at an additional section parallel to the first section, the lateral surfaces form angles B2, B3 and so on, with one another in at least one direction away from points of contact of the lateral surfaces and the side walls, at points of intersection defined by a second plane parallel to the back of the steel punching sheet and passing through the points of contact, which angles increase continuously so that B1<B2<B3 and so on.

Advantageously, the tool has the following additional features:

The lateral surfaces have identical second order surfaces that are symmetrical with respect to the longitudinal axis of each pin.

The second order surfaces comprise spherical caps having a radius of 0.05 to 1.5 mm.

The pins have end faces, and the lateral surfaces have a continuous transmission means to the end faces.

The transmission means has a radius of curvature of 0.001 mm to 0.1 mm.

The angle B1 is 5 to 50% greater then angle $\alpha$, for reducing the normal distance between said punching edge and the back of the steel punching sheet; preferably, angle B1 is 10 to 20% greater than angle $\alpha$.

The pins have upper ends, and angle $\alpha$ is equal to angle B1, and angles B', B", and so on are formed by tangents on the lateral surfaces at points at which any planes which are parallel to the second plane and are shifted with respect to the upper ends of the pins pass through the lateral surfaces, as viewed in the first section, the angles B', B", and so on being smaller than the angle $\alpha$. This is for increasing the normal distance between the punching edge and the back of the steel punching sheet.

Preferably, angles B',B", and so on are 2 to 50% smaller than angle $\alpha$, more particularly, 5 to 20% smaller.

The pins are mounted rotatably about their longitudinal axis in the holder.

Pin screws with conical end surfaces pass laterally through the holder, and the pins have upper ends that are beveled and formed for engaging the conical surfaces.

Clamping screws are provided for detachably fixing the pins in the holder.

It is essential either that the steel punching sheet has been additionally processed by a material-removing method in a conventional manner at its back, which may be evident in a change in the texture of the steel sheet material, or that the original steel support sheet is covered with a layer of different thickness.

In the first step of the production of steel punching sheets, which corresponds to the prior art, the starting steel sheet is covered with etch resists and then subjected to a relief etching process to produce the webs carrying the punching edges. About 0.3 mm deep reliefs are thus produced in a steel sheet. The webs thus formed have an approximately trapezoidal cross-section. In a subsequent fine etching step, projecting material is removed but the sharpness of the punching edges is not substantially improved. The punching edges therefore have to be subsequently ground until they are sharp. This can be achieved by various methods; for example, according to German Patent 3,618,768, two etch resists of different materials are removed on the starting steel sheet, initially by deep etching and then by fine etching, so that sharp punching edges are formed. However, in this case as in the conventional mechanical NC processes, there are limits to the achievement of the tolerance required for the ideal dimension. This ideal dimension, i.e., the required normal distance between punching edge and back of the steel punching sheet, must be the same for all punching edges, since all punching edges must completely penetrate the label layer in the same manner when the steel punching sheet is pressed, and the support film must not be scratched. Thus, for example for the most common thicknesses of the support films of 0.05 to 0.15 mm and a thickness of the label layer of about 0.1 mm, a tolerance of 0.02, preferably 0.005 mm, is desirable for the ideal dimension.

For various materials, especially those laminated with plastics, steel punching sheets, for which a height tolerance of 0.005 mm is in any case required, are desirable. In addition, it is precisely for this type of steel punching sheets that the quality of the cutting edge is of considerable importance. The edge width is defined in different ways, depending on the form of the edge. Thus, for rounded edges, this is understood as meaning the shortest distance between the two sidewalls at the point where the sidewall slope becomes the edge curvature. For edges which are more or less flat at the cutting point, the edge width is defined as the shortest distance determined by the points of intersection of the upper edge surface (or of the tangent at said surface parallel to the steel punching sheet), with the two sidewalls (or the vanishing lines thereof).

The edge width, which determines the sharpness of the edge, must in any case be less than 0.005 mm for such steel punching sheets, a value which cannot be realized by the processes known from the prior art, in particular owing to the simultaneous requirement for a height tolerance of 0.005 mm . Although the steel punching sheet provided with an excess dimension after etching is ground to the ideal dimension with the required tolerance, because of the resulting different widths of the end faces of the punching edges, due to the steel sheet tolerances and etch tolerances, it will not be possible, both in manual and in NC sharpening, to achieve either—where the height tolerance is maintained— an edge corresponding to the requirement for a maximum width of 0.005 mm or, with the correspondingly correct sharpening of the punching edges, the ideal height dimension having the required tolerance.

In the case of the steel punching sheet according to the invention, the ideal height is set to the required tolerance, and this setting can be effected fully automatically. According to the invention, this is carried out by adjusting the ideal dimension to either exclusively positive or exclusively negative tolerance during machine processing. A steel punching sheet having punching edges of positive tolerance is then treated by a material-removing process on its back, in accordance with the process according to the invention. This process has the advantage that the ideal dimension can easily be set (by a difference measurement adjustable to maxima or by similar suitable measurements) and any excess dimension on the back can be removed in a controlled manner over a large area of all punching edges. A material-removing method which has proven particularly suitable is lapping, since it can be carried out extremely precisely by changing the order of the lapping plate, the lapping direction and the lapping material, although other methods are possible, for example surface grinding, electrochemical removal, laser processing, etc.

Alternatively, filling the deficient dimension formed during grinding of the punching edges having negative tolerance with a layer of, for example, plastic, which cures from a liquid two-component phase, is possible, The controlled filling of the back to the ideal dimension with the required tolerance also permits, where required, subsequent fine grinding following filling with an excess dimension.

In order to be able to carry out this material-removal or filling process in a controlled manner and with adjustment, the steel punching sheets are placed on an exactly flat holding plate so that the punching edges rest on said plate and the steel punching sheet is fixed. This may be effected either magnetically or with the aid of a vacuum or quite simply by means of retaining pins. Placing the steel punching sheet on a magnetic cylinder may be advantageous for further operations.

The introduction of lamellar spacers on the surfaces between the webs is particularly advantageous in vacuum or magnetic fixing for the subsequent processing steps, in order to counteract excessive indentation of the intermediate surfaces.

The introduction of lamellar spacers which in any case entails at least one additional operation, can be dispensed with if the retaining plate or retaining cylinder provided is a regulatable magnetic plate or regulatable magnetic cylinder. When a vacuum is used, regulation of the retaining force can be effected in the same manner via vacuums of different magnitudes. Depending on the steel sheet material and the distance between the individual punching edges, this provides the retaining force required for the subsequent grinding or lapping or material-removing process, without the intermediate surfaces being indented as a result of unnecessarily high retaining forces.

The steel punching sheet produced by the process according to the invention is distinguished by sharp punching edges—the width is less than 0,005 mm—in conjunction with maximum machine precision of the ideal dimension. This ideal dimension, which is achieved purely mechanically in the manner described above, is, however, determined by machine tolerances—which are inherent in mechanical production processes—with the result that subsequent processing of the punching edges at various points may prove necessary.

Up to the present, subsequent correction of the steel punching sheet at the punching edges was not possible in practice on the punching press. With the aid of the tool according to the invention, however, even localized height correction is possible while retaining the existing punching edge sharpness corresponding to the required tolerances. The tool consists of two HM (hard metal) pins which are held together in a holder and have diametrically opposed, curved lateral surfaces at their ends. If these surfaces are in the form of spherical caps, they can be readily produced with the required precision. The lower end surfaces of the two HM pins are surfaces of slight curvature which are at right angles to the longitudinal dimension of the pins and are preferably flat for reasons relating to production technology. This avoids the HM pins resting against the surface of the intermediate spaces during corrective processing of the punching edges. A circular edge representing the transition between these end surfaces and the lateral surfaces and having a correspondingly small radius of curvature prevents the formation of a notch in the sidewall of the punching edge in the event of careless mounting of the tool.

If it is found, for example in a test punching or during adjustment of the punching unit of the punching press, that opposite corrections are necessary at different points, the tool is guided along the punching edge with pressure being exerted at these points. Owing to the curvature of the lateral surfaces and the slope of the sidewalls of the punching edges, the blade of the punching edge is at most gripped by the tool and in no way flattened. If the tool is moved along the punching edge under pressure, pressure is exerted only on the sidewalls of the punching edge, just below the edge. Depending on the tool, the result is a pressing down and hence an increase in the height of the punching edges or contact and hence a reduction in height of the punching edges. The tools for pressing down or contact—for processing punching edges having the same sidewall slopes—differ only in the magnitude of the angle between the particular end lateral surfaces of the tool, as described.

If the two HM pins are rotatably mounted in a holder along their common longitudinal axis, the opposite correction of even curved punching edges can be carried out without difficulty.

The opposite correction of the ideal dimension, which is possible with the aid of the tool according to the invention, is up to ±0.04 mm. The fact that even corrections of corrections which may sometimes be necessary, are possible proves to be particularly advantageous in the case of the corrections achieved with the aid of the tool according to the invention.

The HM pins, which preferably have a square cross-section, can be adjusted under the microscope via pin screws which pass laterally through the holder and whose ends are conical. For this purpose, oblique surfaces which engage the conical ends of the pin screws are formed on the upper end of the HM pins.

If these oblique, upper end surfaces of the HM pins form the lateral surfaces of a truncated pyramid, the HM pins can, depending on wear, be rotated about their longitudinal axes, readjusted and fixed in the holder by means of clamping screws.

Subsequent processing of the punching edges with the non-cutting, pressure-exerting tool permits not only correction of the height of the punching edge but at the same time results in improved surface quality of the sidewalls of the punching edges in the region directly adjacent to the punching edge. Subsequently processed sidewalls of the punching edge have smoother surfaces and, owing to the compression of the surface effected by the pressing procedure, prolong the life of the steel punching sheet.

DESCRIPTION OF THE DRAWINGS

Further details are given in the following description of embodiments shown schematically in the drawings.

DETAILED DESCRIPTION OF PREFERRED EMBODIMENTS

All figures should be regarded as schematic and not true to scale; they are described in relation to one another; identical parts are provided with the same reference symbols, while similar parts are provided with the same reference symbols but with different indices.

Figure 1:
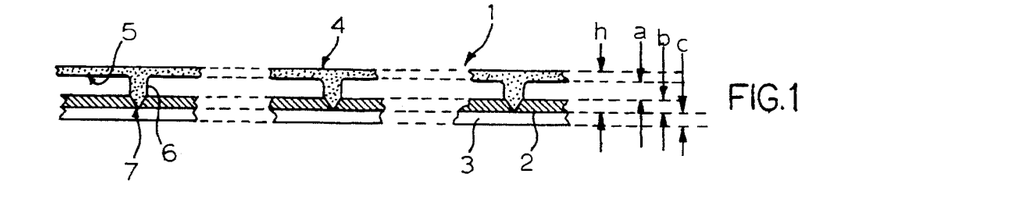
FIG. 1 shows a section through a steel punching sheet, a label layer and a support film.

FIG. 1 shows the conditions during punching of the labels. A label layer 2 is applied to a support film 3. A steel punching sheet 4 cuts the labels from the label layer 2 by means of the punching edges 7 of its webs 6. The punching edges 7 must penetrate the label layer 2 completely when the steel punching sheet 1 is pressed on, which is effected by means of a plate or roller (not shown), and the support film 3 must not be scratched. It can be seen that the ideal dimension h, i.e., the ideal distance between the punching edges 7 and back 4 of the steel punching sheet 1, must be the same for all punching edges 7. For the most common thicknesses c of the support films 3 of 0.05 –0.15 mm and a thickness b of the label layer of about 0.1 mm, a tolerance of 0.02 mm, preferably 0.005 mm, is desirable for the ideal dimension h. This means that the ideal dimension is within the desired tolerance range. The cavity (a) between the front 5 of the steel punching sheet 1 and the surface of the label layer 2 is determined by the guidance of the plates or rollers (not shown), be means of which the steel punching sheet 1 is pressed onto the label layer 2.

Figure 2:
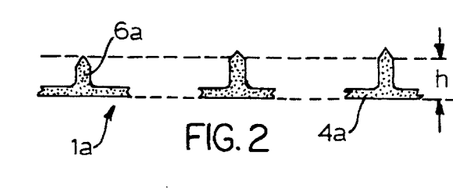
FIG. 2 shows a section through a steel punching sheet having positive tolerance.
Figure 3:
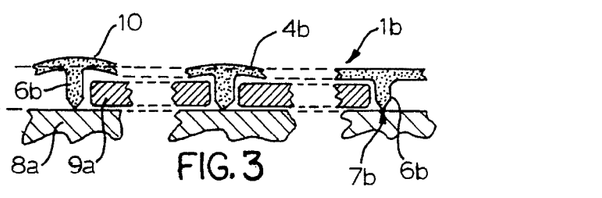
FIG. 3 shows a section through a steel punching sheet of FIG. 2, on a holding surface.

FIG. 2 shows the steel punching sheet 1a whose punching edges 7a were processed with positive tolerance. Such a steel punching sheet 1b is, as shown in FIG. 3, oriented with its punching edges 7b on a retaining plate 8a. It may be expedient for further processing to introduce lamellar spacers 9a between the retaining plate 8a and the free regions between the webs 6b. The dimensions of these lamellar spaces 9a will be determined in length and width by somewhat smaller label dimensions, while the thickness may correspond to not more than the sum of the distance a and the thickness of the label layer b, but should in any case be greater than b. The steel punching sheet 1b is then fixed to the retaining plate 8a, for example magnetically, by means of a vacuum or by retaining pins.

If retaining plates having variable magnetic force are used, it is possible to dispense with the introduction of lamellar spacers.

The back 4b of the steel punching sheet 1b is then ground to the ideal dimension h by means of a grinding disk adjusted exactly parallel to the retaining plate 8a.

Figure 4:
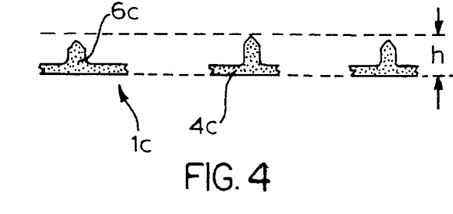
FIG. 4 shows a section through a steel punching sheet having a negative tolerance.
Figure 5:
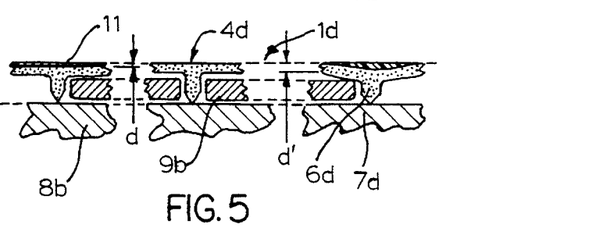
FIG. 5 shows a section through a steel punching sheet of FIG. 4, on a holding surface.

According to FIG. 4, the punching edges 7c of a steel punching sheet 1c are processed with a tolerance which is now negative. The punching edges 7d of the webs 6d are fixed, possibly with prior introduction of the lamellar spacers 9b, in a suitable manner on the oriented retaining plate 8b, analogously to the procedure described above (FIG. 5). In this case, a layer 11 must now be applied to the back 4d of the steel punching sheet 1d in order to obtain the required ideal dimension h. Application of a layer 11 of plastic which cures from a liquid two-component phase is possible. Filling, which is carried out exactly to the dimension of the ideal height h, is preferred. However, if the subsequent grinding to the ideal height h is necessary, this can be effected, for example, in the manner described above, over a large surface and with easy adjustment.

Figure 6:
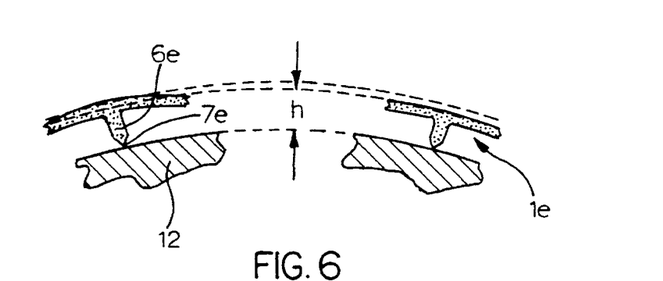
FIG. 6 shows a section through a steel punching sheet on a retaining cylinder.

As shown in FIG. 6, it is also possible to use retaining cylinders 12 instead of sheet-like retaining plates 8a, 8b. Such retaining cylinders, which may preferably be magnetic cylinders having adjustable magnetic force, permit the steel punching sheet 1e to be clamped in an arc-like manner, subsequent removal of material from the back 4e being effected on a circular grinding machine.

A steel punching sheet produced in this manner will thus have the maximum possible precision, which is determined solely by the tolerances of the machines. It may be that the ideal height dimension—less than 0.005 mm in the case of a guaranteed edge width—then still does not have the required tolerances of 0.005 mm. However, even assuming that the mechanically produced steel punching sheet corresponds to the tolerance requirements for the ideal height dimension, an undesirable non uniform punching process may take place during punching of the labels. The steel punching sheets are wound around a magnetic cylinder and pressed against the label layer applied to a support film. Depending on the arrangement of the punching edges on the cylinder surface, the contact pressure on the label layer will vary. Thus, in particular the punching edges in the running direction will exert a lower contact pressure than those at right angles to this direction. By means of a test punching or during adjustment of the punching unit on the press, it is possible to check where the support film is scratched, where the label layer is not completely cut through and where the punching process proceeds correctly. However, this means that a subsequent opposite correction will prove necessary and will be carried out manually with the aid of the tool according to the invention, in an exactly defined manner.

Figure 7:
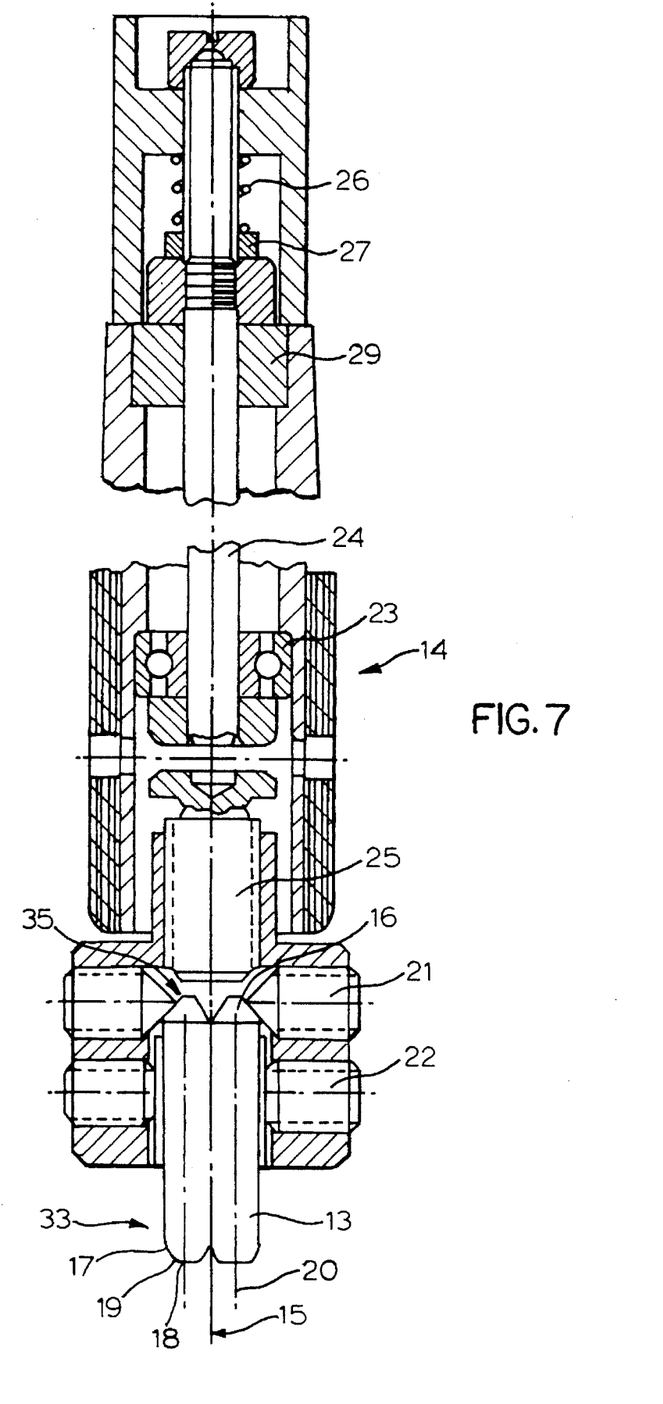
FIG. 7 shows a longitudinal section through a tool according to the invention.

FIG. 7 shows a longitudinal section through the tool according to the invention. Two HM pins 13 (HM =hard metal) are mounted in a holder 14, preferably so that they are rotatable with one another about their common longitudinal axis 15. The two HM pins 13, which have a square cross-section, are bordered at their upper end by truncated, regular pyramids 16. Their lower end is formed by curved lateral surfaces 17 which are intended to act on the sidewalls 30 of the punching edges, and end faces 18 which are at right angles to the longitudinal axis 15 and are preferably flat, a circular edge 19 being provided between lateral surfaces 17 and end faces 18 to ensure a continuous transition. The lateral surfaces 17 are preferably rotational surfaces of curves around the particular longitudinal axes 20 of the HM pins 13, for example spherical zone surfaces. The two HM pins 13 can be adjusted under the microscope by means of the conical ends of pin screws 21 and the lateral surfaces of the pyramids 16 at the upper end of the HM pins 13, in such a way that the lateral surfaces 17 of the two HM pins 13 show exactly mirror-image symmetry with respect to the common longitudinal axis 15. Clamping screws 22 then fix the two HM pins 13 in the holder 14. The rotatable mounting of the HM pins 13 is effected in a conventional manner. For this purpose, the holder 14 has a shaft 24 having shaft head 25, a radial ball bearing 23, possibly a spring 26, a bearing 29 and securing nuts 27.

Figure 8:
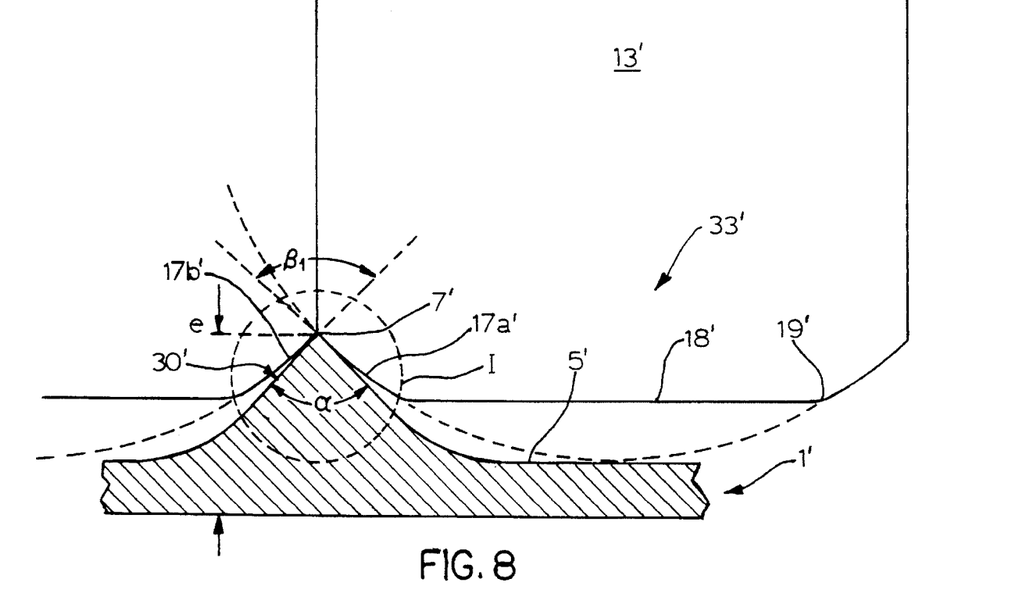
FIG. 8 shows a cross-section through a punching edge and a detailed section through a tool for contact, according to FIG. 7.
Figure 8A:
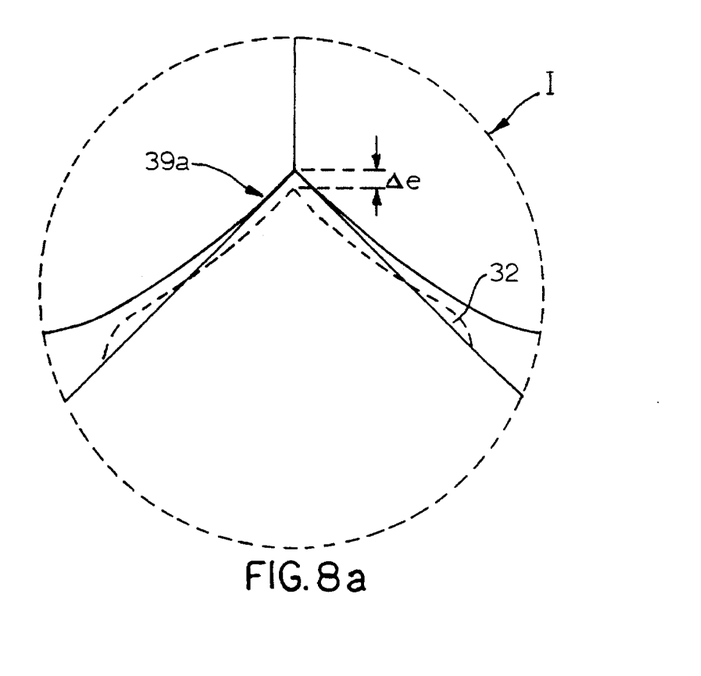
FIG. 8a shows the detail I of FIG. 8.
Figure 9:
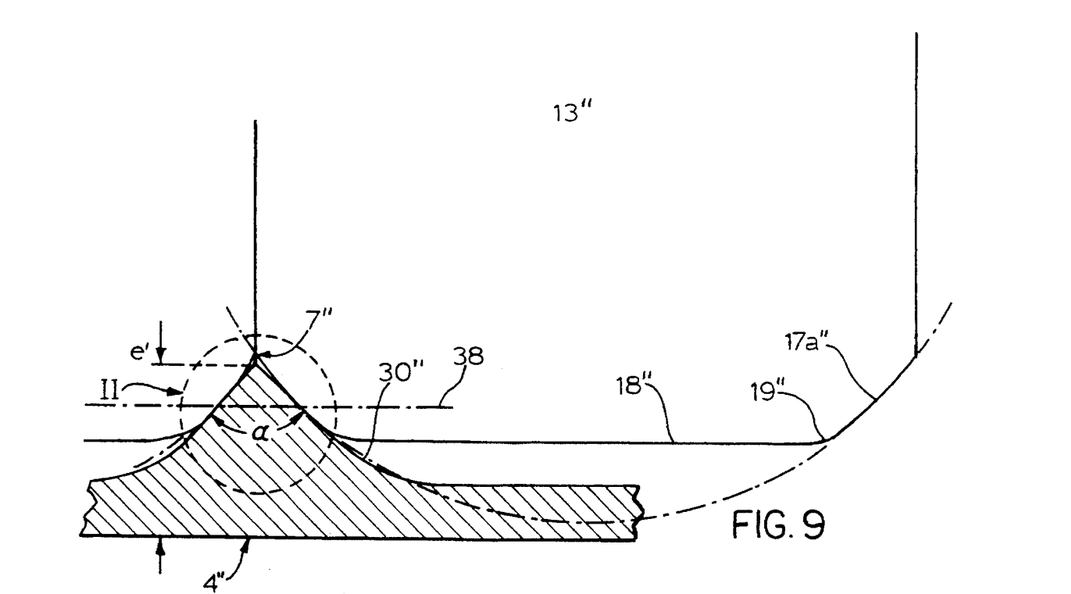
FIG. 9 shows a cross-section through a punching edge and a detailed section through a tool for pressing down, according to FIG. 7.

FIG. 8 and 8a or 9 and 9a show how the punching edges 7 can be subsequently corrected with the aid of the tool in the region of their sidewalls 30 by contact (FIG. 8) or pressing down (FIG. 9). The tool, only the lower end of which is shown in FIG. 8 and 9, is placed on the sidewalls 30 of the punching edges 7—the web supporting them is formed here solely by the sidewalls 30.

FIG. 8 and 9 correspond to a section through a plane which is designated as the first plane and is parallel to a plane which is determined by the two longitudinal axes 20 of the two HM pins 13 (and will in general coincide with these). The position of this plane is determined by the contact points 39 at which the lateral surfaces 17 and the sidewalls 30 touch one another. The angle α between the two sidewalls 30 and the angle β1 between the tangents 40 to the lateral surfaces 17 at the contact points 39 are in both cases, i.e. both for the reducing (FIG. 8) and for the increasing (FIG. 9) tool, virtually the same. The reducing tool rests with its contact points 39a directly on both sides of the punching edge 7, where the lateral surfaces 17 of the two HM pins 13 begin to move apart at their lower end 33.

Figure 9A:
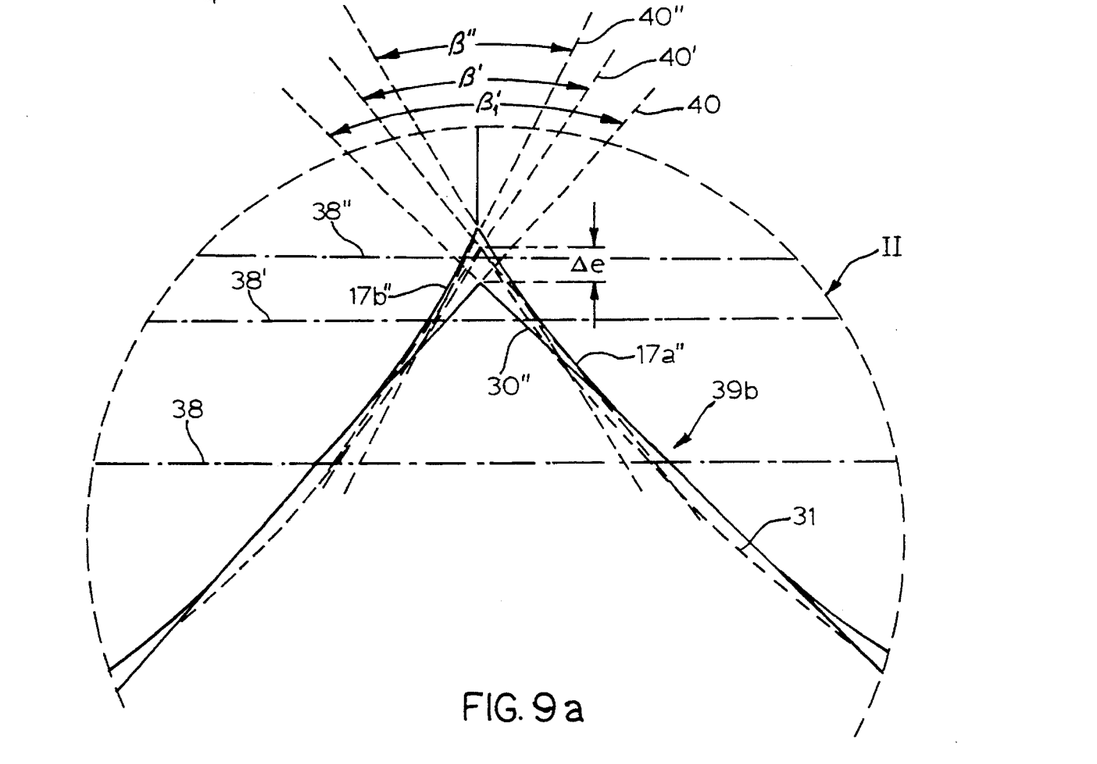
FIG. 9a shows the detail II of FIG. 9.

For the increasing tool, these contact points 39b, at which the angle β1' of two tangents 40 to the lateral surfaces 17 is equal to the sidewall angle α, are slightly below the point at which the lateral surfaces 17 begin to move apart. This results in the requirement that, in this case, the tangent angle β', β", etc. must be smaller than the angle β1' at the contact points 39b; the tangent angles β', β", etc. are those between the tangents 40', 40", etc. to the lateral surfaces 17 at points at which the lateral surfaces 17, in section, pass through plates 38',38",etc. which are parallel to the second plane 38 and shifted with respect to the upper end 35 of the HM pins 13. Hence, β1'>β'>β">. . . (FIG. 9a).

In contrast, the contact points 39a of the reducing tool, as mentioned and as can be seen in FIG. 8a, are in the region directly adjacent to the punching edge 7'; to protect the punching edge 7' during contact, the angle β 1 must therefore be as far as possible equal to the angle α. Damage to the punching edge 7' during contact is ruled out because the tool consists of two parts, namely the two HM pins 13, whose two end lateral surfaces 17' have a clearly defined angle, which is preferably equal to α, at their point of intersection.

FIG. 8 shows the tool with its lateral surfaces 17', formed at the lower ends 33' of the HM pins 13', resting against the sidewalls 30' of the punching edge 7'. The distance e should in this case be reduced without the edge 7' losing its sharpness produced by mechanical processing. The two lateral surfaces 17'a and 17'b of the two HM pins 13' form, at their point of intersection, an angle β which corresponds to the angle α formed between the two sidewalls 30'. Thus, in the corrective pressing process carried out along the edge 7', the edge 7' is held in a protective manner. The pressure on the lateral sidewalls 30', in their region located just at the edge 7', causes slight "compression," with the result that convex areas 32 form on the sidewalls 30' and the distance e is reduced. FIG. 8a shows the convex areas 32 as a detail I from FIG. 8, the distance being reduced by Δe. It is clear that the punching edge 7' is not changed in this correction process and its sharpness is thus retained. Very slight corrections of 0,001 mm in an upward direction is thus possible.

The lateral surfaces 17' are surfaces of spherical zones (the periphery of the sphere is indicated by a dash-dot line)

which are bordered at the lower end by the faces 18'. When the tool is placed on the punching edge 7', the lower edge 33' of the HM pin 13' will thus not come to rest on the upper side 5' of the steel punching sheet 1' and will prevent movement of the tool. A circular edge 19' between lateral surface 17' and end face 18' gives rise to a continuous transition between the two surfaces, so that there is no troublesome edge which could lead to undesirable notches in the event of careless positioning of the tool on the punching edge 7'.

FIG. 9 shows, in an analogous manner, the increase in a punching edge 7", whose distance e' from the back 4" of the steel punching sheet 1" is too small. The tool, which essentially corresponds to the tool shown in FIG. 8 for contact, differs from the latter in the sequence of the angles β1', β',β", etc., as described above. The tool is moved with the application of pressure, the sidewalls 30" of the punching edge 7" are therefore pressed against one another along said edge and the punching edge 7" is thus raised. As can be seen in FIG. 9a, which shows the detail II of FIG. 9, indentations 31 in the sidewalls 30" are produced in this correction process; the punching edge 7" is raised into the free space located between the lateral surfaces 17" of the tool, the punching edge 7' and the sidewalls 30". Thus, the distance e' is increased by Δe'.

After prolonged use of the tool, the square cross-section of the HM pins and the embodiment of their upper end in the form of a pyramid allow, after unscrewing of the clamping screws, each of the pins to be rotated through 90°, to be readjusted and to be used again, as described above. Similarly, upper ends which have all possible rotationally symmetric cross-sections or are in the form of an equilateral triangle, hexagonal or octagonal or even round and are appropriately shaped can of course be provided for the HM pins in order to permit readjustments.

The shape of end face 18" and circular edge 19" corresponds to the tool described in FIG. 8.

The tool, either the reducing or the increasing one, can of course also be used in, for example, computer-controlled CNC machines.

I claim:

1. A process for the production of a steel punching sheet, comprising:

covering a steel starting sheet with etch resists, subjecting said steel starting sheet to at least one etching process, forming on said steel starting sheet a sharply defined punching edge with an extended configuration, with a perpendicular distance between said punching edge and a back of said steel punching sheet that has a positive tolerance with respect to a required perpendicular distance, and removing steel material from said back of said punching sheet to achieve said required perpendicular distance within a tolerance of not more than 0.02 mm over said extended configuration of said punching edge.

2. A process as claimed in claim 1, wherein said material removing step comprises removing material by grinding said back.

3. A process as claimed in claim 1, further comprising orienting said punching edge towards a retaining plate and fixing said punching sheet to said retaining plate prior to removing steel starting material from said back of said punching sheet.

4. A process as claimed in claim 3, further comprising introducing lamellar spacers between a front of said punching sheet and said retaining plate prior to removing steel starting material from said back of said punching sheet, said front of said punching sheet being opposite said back.

5. A process as claimed in claim 3, wherein said fixing step comprises fixing said punching sheet to said retaining plate by a regulatable retaining force.

6. A process as claimed in claim 3, wherein said fixing step comprises fixing said punching sheet to said retaining plate by magnetic means.

7. A process as claimed in claim 1, wherein said punching edge is not more than 0.01 mm. wide.

8. A process as claimed in claim 7, wherein said punching edge is not more than 0.005 mm. wide.

9. A process as claimed in claim 8, wherein said punching edge is not more than 0.001 mm. wide.

10. A process as claimed in claim 1, wherein said material is removed from said back by grinding said back to said required perpendicular distance with a tolerance of not more than 0.005 mm.

11. A process for the production of a steel punching sheet, comprising:

covering a steel starting sheet with etch resists, subjecting said steel starting sheet to at least one etching process, forming on said steel starting sheet a sharply defined punching edge with an extended configuration, with a perpendicular distance between said punching edge and a back of said punching sheet having a negative tolerance with respect to a required perpendicular distance, applying material to said back to adjust said perpendicular distance between said punching edge and said back to a positive tolerance with respect to said required perpendicular distance and removing material from said back to achieve said required perpendicular distance within a tolerance of not more than 0.02 mm over said extended configuration of said punching edge.

12. A process as claimed in claim 11, wherein said material is removed from said back by grinding said back to said required perpendicular distance with a tolerance of not more than 0.005 mm.

13. A process for production of a steel punching sheet, comprising:

covering a steel starting sheet with etch resists, subjecting said steel starting sheet to at least one etching process, to form at least two side steel walls thereon, removing steel material from said side walls to form a sharply defined punching edge, and pressing a non-cutting tool along said side walls immediately adjacent said side punching edge to form compressed curve surfaces on both of said walls immediately adjacent said punching edge to adjust said punching edge to a required perpendicular distance between said punching edge and a back of said punching sheet within a defined tolerance.

14. A process as claimed in claim 13, wherein said pressing step comprises pressing convex curved surfaces on said side walls to decrease a perpendicular distance between said punching edge and said back of said punching sheet to said required perpendicular distance within said defined tolerance.

15. A process as claimed in claim 13, wherein said pressing step comprises pressing concave curved surfaces on said side walls to increase a perpendicular distance between said punching edge and said back of said punching sheet to said required perpendicular distance within said defined tolerance.

16. A process as claimed in claim 13, wherein said defined tolerance is not more than 0.02 mm.

17. A process as claimed in claim 13, wherein said defined tolerance is not more than 0.005 mm.

18. A process as claimed in claim 13, wherein said pressing step comprises pressing said non-cutting tool along said side walls immediately adjacent said punching edge at at least one localized place to adjust said punching edge at said at least one localized place to said require perpendicular distance within said defined tolerance.

* * * * *